US012220379B2

(12) United States Patent
Duncan

(10) Patent No.: US 12,220,379 B2
(45) Date of Patent: Feb. 11, 2025

(54) LOW EMF HALOGEN TUBE HEATER

(71) Applicant: Sauna Works Inc., Berkeley, CA (US)

(72) Inventor: Raleigh C. Duncan, Berkeley, CA (US)

(73) Assignee: Sauna Works Inc., Berkeley, CA (US)

( * ) Notice: Subject to any disclaimer, the term of this patent is extended or adjusted under 35 U.S.C. 154(b) by 0 days.

(21) Appl. No.: 18/402,632

(22) Filed: Jan. 2, 2024

(65) Prior Publication Data

US 2024/0130929 A1 Apr. 25, 2024

Related U.S. Application Data

(63) Continuation of application No. 17/931,889, filed on Sep. 13, 2022, now Pat. No. 11,896,547, which is a (Continued)

(51) Int. Cl.

*A61H 33/06* (2006.01)
*H05B 3/00* (2006.01)
*H05B 6/44* (2006.01)

(52) U.S. Cl.

CPC ........... *A61H 33/063* (2013.01); *H05B 3/008* (2013.01); *H05B 6/44* (2013.01)

(58) Field of Classification Search

CPC ...... H05B 6/44; H05B 3/0038; H05B 3/0052; H05B 3/0076; H05B 3/008; H05B 3/009; H05B 3/04; H05B 3/145; H05B 3/148; H05B 3/44; H05B 3/82; A61H 33/06; A61H 33/063

(Continued)

(56) References Cited

U.S. PATENT DOCUMENTS

| | | | |
|---|---|---|---|
| 2,146,977 | A | 2/1939 | Emil |
| 2,416,977 | A | 3/1947 | Brown et al. |

(Continued)

FOREIGN PATENT DOCUMENTS

| | | | |
|---|---|---|---|
| CN | 201639794 | U | 11/2010 |
| CN | 206237620 | U | 6/2017 |

(Continued)

OTHER PUBLICATIONS

"Advisory Action", Advisory Action U.S. Appl. No. 13/427,899, dated Sep. 27, 2016, 3 pages.

(Continued)

*Primary Examiner* — Hung D Nguyen
(74) *Attorney, Agent, or Firm* — Kwan & Olynick LLP

(57) ABSTRACT

Sauna heaters are used to generate heat for saunas. Sauna heaters include a first halogen tube configured to generate heat, a second halogen tube configured to generate heat, wherein the first halogen tube is implemented a distance from the second halogen, and wherein the distance between the first halogen tube and the second halogen tube is configurable to adjust an amount of electromagnetic field (EMF) emitted by the heater. Sauna heaters also include a source of alternating current electrically coupled to the first halogen tube and the second halogen tube such that the source of alternating current is configured to provide the first halogen tube and the second halogen tube with a current, wherein the current powering the first halogen tube is out of phase with the current powering the second halogen tube.

20 Claims, 4 Drawing Sheets

Related U.S. Application Data continuation of application No. 16/693,109, filed on Nov. 22, 2019, now Pat. No. 11,471,376, which is a continuation of application No. 15/226,756, filed on Aug. 2, 2016, now Pat. No. 10,517,794, which is a continuation-in-part of application No. 13/427,899, filed on Mar. 23, 2012, now Pat. No. 9,844,100.

(60) Provisional application No. 62/200,077, filed on Aug. 2, 2015, provisional application No. 61/467,884, filed on Mar. 25, 2011.

(58) Field of Classification Search
USPC ...... 219/220, 462.1, 463.1, 464.1, 486, 507, 219/470, 522, 600; 392/355, 407, 416
See application file for complete search history.

(56) References Cited

U.S. PATENT DOCUMENTS

| | | | |
|---|---|---|---|
| 5,023,433 | A | 6/1991 | Gordon |
| 5,296,686 | A | 3/1994 | Ullrich et al. |
| 5,761,377 | A | 6/1998 | Wolfe et al. |
| 5,796,076 | A | 8/1998 | Azuma |
| 5,889,923 | A | 3/1999 | Lee et al. |
| 6,300,597 | B1 | 10/2001 | Lee |
| 7,120,353 | B2 | 10/2006 | Schaeffer et al. |
| 7,538,279 | B2 | 5/2009 | Lee |
| 8,692,168 | B2 | 4/2014 | Benda et al. |
| 9,393,176 | B2 | 7/2016 | Benda et al. |
| 9,844,100 | B2 | 12/2017 | Duncan et al. |
| 10,869,367 | B2 | 12/2020 | Duncan |
| 11,202,346 | B2 | 12/2021 | Duncan et al. |
| 11,471,376 | B2 | 10/2022 | Duncan |
| 11,641,702 | B2 | 5/2023 | Duncan |
| 11,792,896 | B2 | 10/2023 | Duncan |
| 11,896,547 | B2 | 2/2024 | Duncan |
| 2003/0031471 | A1 | 2/2003 | Schneider et al. |
| 2003/0156831 | A1 | 8/2003 | Schaeffer et al. |
| 2006/0180336 | A1 | 8/2006 | King et al. |
| 2006/0289463 | A1 | 12/2006 | Kil |
| 2007/0110413 | A1 | 5/2007 | Konishi |
| 2008/0143249 | A1 | 6/2008 | Lee et al. |
| 2008/0292293 | A1 | 11/2008 | Song |
| 2009/0279879 | A1 | 11/2009 | Zenteno et al. |
| 2010/0072892 | A1 | 3/2010 | Watanabe et al. |
| 2012/0241440 | A1 | 9/2012 | Duncan et al. |
| 2013/0187066 | A1 | 7/2013 | Heller et al. |
| 2013/0319998 | A1 | 12/2013 | Benda et al. |
| 2014/0374403 | A1 | 12/2014 | Smith |
| 2018/0063898 | A1 | 3/2018 | Duncan et al. |
| 2019/0110339 | A1 | 4/2019 | Duncan et al. |
| 2020/0100984 | A1 | 4/2020 | Duncan |
| 2021/0076461 | A1 | 3/2021 | Duncan et al. |
| 2021/0368590 | A1 | 11/2021 | Duncan et al. |
| 2023/0232505 | A1 | 7/2023 | Duncan et al. |
| 2023/0413396 | A1 | 12/2023 | Duncan et al. |

FOREIGN PATENT DOCUMENTS

| | | | |
|---|---|---|---|
| JP | S588673 | A | 1/1983 |
| JP | H07312277 | A | 11/1995 |
| JP | H10261542 | A | 9/1998 |
| WO | 2020113134 | A1 | 6/2020 |

OTHER PUBLICATIONS

"Final Office Action", Final Office Action, U.S. Appl. No. 13/427,899, dated Aug. 24, 2015, 6 pages.
"Int'l Application Serial No. PCT/US17/45171, Int'l Search Report and Written Opinion dated Oct. 12, 2017", 7 pages.
"Non-Final Office Action", Non-Final Office Action, U.S. Appl. No. 13/427,899, dated Feb. 12, 2015, 5 pages.
"U.S. Appl. No. 13/427,899, Advisory Action dated Jun. 8, 2017", 3 pages.
"U.S. Appl. No. 13/427,899, Final Office Action dated Mar. 31, 2017", 8 pages.
"U.S. Appl. No. 13/427,899, Notice of Allowance dated Aug. 8, 2017", 5 pgs.
Advisory Action Advisory Action U.S. Appl. No. 13/427,899, mailed Sep. 27, 2016, 3 pgs.
Advisory Action U.S. Appl. No. 13/427,899, mailed Sep. 27, 2016, 3 pgs.
U.S. Appl. No. 15/806,262, Final Rejection, filed Mar. 2, 2020, 7 pgs.
U.S. Appl. No. 15/806,262, Notice of Allowance and Fees Due (Ptol-85), filed Aug. 13, 2020, 7 pgs.
U.S. Appl. No. 16/206,706, Non-Final Rejection, filed Nov. 20, 2020, 11 pgs.
U.S. Appl. No. 17/101,909, USPTO e-Office Action: CTFR—Final Rejection, filed May 19, 2023, 9 pages.
U.S. Appl. No. 17/101,909, USPTO e-Office Action: CTNF—Non-Final Rejection, filed Dec. 14, 2022, 11 pages.
U.S. Appl. No. 17/101,909, USPTO e-Office Action: NOA—Notice of Allowance and Fees Due (Ptol-85), filed Aug. 2, 2023, 7 pages.
U.S. Appl. No. 17/394,315, USPTO e-Office Action: NOA—Notice of Allowance, filed Feb. 14, 2023, 17 pages.
U.S. Appl. No. 17/469,739, USPTO e-Office Action: NOA—Notice of Allowance and Fees Due (Ptol-85), filed Mar. 25, 2024, 9 pages.
U.S. Appl. No. 17/931,889, USPTO e-Office Action: CTFR—Final Rejection, filed Aug. 11, 2023, 8 pages.
U.S. Appl. No. 17/931,889, USPTO e-Office Action: CTNF—Non-Final Rejection, filed Apr. 17, 2023, 6 pages.
U.S. Appl. No. 17/931,889, USPTO e-Office Action: NOA—Notice of Allowance and Fees Due (Ptol-85), filed Oct. 20, 2023, 7 pages.
U.S. Appl. No. 18/186,847, USPTO e-Office Action: CTNF—Non-Final Rejection, filed Dec. 4, 2023, 8 pages.
U.S. Appl. No. 13/427,899, Advisory Action mailed Jun. 8, 2017, 3 pgs.
U.S. Appl. No. 13/427,899, Final Office Action mailed Mar. 31, 2017, 8 pgs.
U.S. Appl. No. 13/427,899, Notice of Allowance mailed Aug. 8, 2017, 5 pgs.
U.S. Appl. No. 15/226,756, Final Office Action Mailed Mar. 18, 2019, 16 pgs.
U.S. Appl. No. 15/226,756, Non Final Office Action mailed Jul. 6, 2018, 14 pgs.
U.S. Appl. No. 15/806,262, Final Office Action mailed Jan. 17, 2019, 9 pgs.
U.S. Appl. No. 15/806,262, Non Final Office Action mailed Jun. 20, 2018, 6 pgs.
U.S. Appl. No. 15/806,262, Non Final Office Action mailed Jul. 15, 2019, 6 pgs.
U.S. Appl. No. 16/206,706, Notice of Allowance mailed Aug. 13, 2021, 8 pgs.
U.S. Appl. No. 16/693,109, Final Office Action mailed 2/10/228 pgs.
U.S. Appl. No. 16/693,109, Non-Final Office Action mailed Jun. 11, 2021, 8 pgs.
U.S. Appl. No. 16/693,109, Notice of Allowance mailed Jun. 24, 2022, 8 pgs.
U.S. Appl. No. 16/206,706, Notice of Allowance mailed May 4, 2021, 8 pgs.
Final Office Action, Final Office Action, U.S. Appl. No. 13/427,899, mailed Aug. 24, 2015, 6 pgs.
Final Office Action, U.S. Appl. No. 13/427,899, mailed Aug. 24, 2015, 6 pgs.
Final Office Action, U.S. Appl. No. 13/427,899, mailed Aug. 24, 2015, 7 pgs.
International Application Serial No. PCT/US19/63797, Preliminary Report on Patentability mailed Jun. 10, 2021, 6 pgs.
International Application Serial No. PCT/US19/63797, Search Report and Written Opinion mailed 02-25-208 pgs.
Int'l Application Serial No. PCT/US17/45171, Int'l Search Report and Written Opinion mailed Oct. 12, 2017, 7 pgs.

(56) References Cited

OTHER PUBLICATIONS

Non-Final Office Action, Non-Final Office Action, U.S. Appl. No. 13/427,899, mailed Feb. 12, 2015, 5 pgs.
Non-Final Office Action, U.S. Appl. No. 13/427,899, mailed Feb. 12, 2015, 5 pgs.
Translation of CN201639794U, Novel low-electromagnetic radiation planar heating body, Nov. 17, 2010, by Pro Quest. (Year: 2010).
Translation of JP 1 0-261542A, Capacitor and Its manufacture, Sep. 29, 1998, by ProQuest. (Year: 1998).
U.S. Appl. No. 15/806,262, Final Office Action dated Jan. 17, 2019, 16 pages.
U.S. Appl. No. 15/806,262, Non-Final Office Action dated Jun. 20, 2018, 9 pages.

LOW EMF HALOGEN TUBE HEATER

CROSS-REFERENCE TO RELATED APPLICATIONS

The present application is a continuation of U.S. application Ser. No. 17/931,889, which is a continuation of U.S. application Ser. No. 16/693,109, issued as U.S. Pat. No. 11,471,376 on Oct. 18, 2022, which is a continuation of U.S. application Ser. No. 15/226,756, issued as U.S. Pat. No. 10,517,794 on Dec. 31, 2019, which claims the benefit of U.S. Provisional App. No. 62/200,077, filed Aug. 2, 2015, and is a continuation-in-part of U.S. application Ser. No. 13/427,899, filed Mar. 23, 2012 and issued as U.S. Pat. No. 9,844,100 on Dec. 12, 2017, which claims the benefit of Provisional App. No. 61/467,884, all of which applications are herein incorporated by reference.

BACKGROUND

Field of the Invention

The present invention relates generally to heaters, and more particularly to halogen-tube heaters for saunas that emit no or minimal EMF.

Background of the Invention

Halogen tube heaters are widely used in saunas, as they provide a good amount of therapeutic heat while being inexpensive, compact, and having low power consumption. However, one drawback of such heaters is that they emit a high electromagnetic field (EMF).

Electromagnetic waves are generated wherever electricity flows. There has been a suggestion that electromagnetic waves induce anxiety in humans and are harmful to general health. Since sauna heating elements are typically used at close range, electromagnetic emissions are a serious concern.

While a metal enclosure (or an enclosure made of another conductive material) can shield the user from electromagnetic waves, such an enclosure would severely lower the heat-generating efficiency of a heating element, which renders it impractical.

A need therefore exists for a halogen tube heater that does not emit a high amount of EMF.

LIST OF FIGURES

SUMMARY OF THE INVENTION

An object of the present invention is to provide a cheap and simple halogen heater for a sauna that emits low or minimal EMF.

The present invention comprises a heater for a sauna, wherein the heater comprises a first halogen tube and a second halogen tube, both powered by alternating current, where the current powering the first halogen tube is opposite in phase from the current powering the second halogen tube.

The distance between the halogen tubes is less than 4 inches, and they are parallel to each other. The tubes are identical in size and power output.

In an embodiment, the tubes are wired together as follows. Each tube comprises a first end and a second end. The first end of the first tube is wired up to a source of alternating current. The second end of the first tube is connected to the second end of the second tube. The first end of the second tube is wired up to the source of alternating current. This way, the current going through the second tube is opposite in phase from the current going through the first tube.

In an embodiment, the tubes are wired as follows. The first end of the first tube and the second end of the second tube are wired up to one pole of the source of alternating current, and the second end of the first tube and the first end of the second tube are wired up to the other pole. This way, the current going through the second tube is opposite in phase from the current going through the first tube.

The halogen tubes are preferably touching each other for maximum cancellation of EMF.

In the preferred embodiment, the heater assembly comprises a reflector for reflecting the heat in a desired direction.

DETAILED DESCRIPTION OF THE PREFERRED EMBODIMENT

Figure 1:
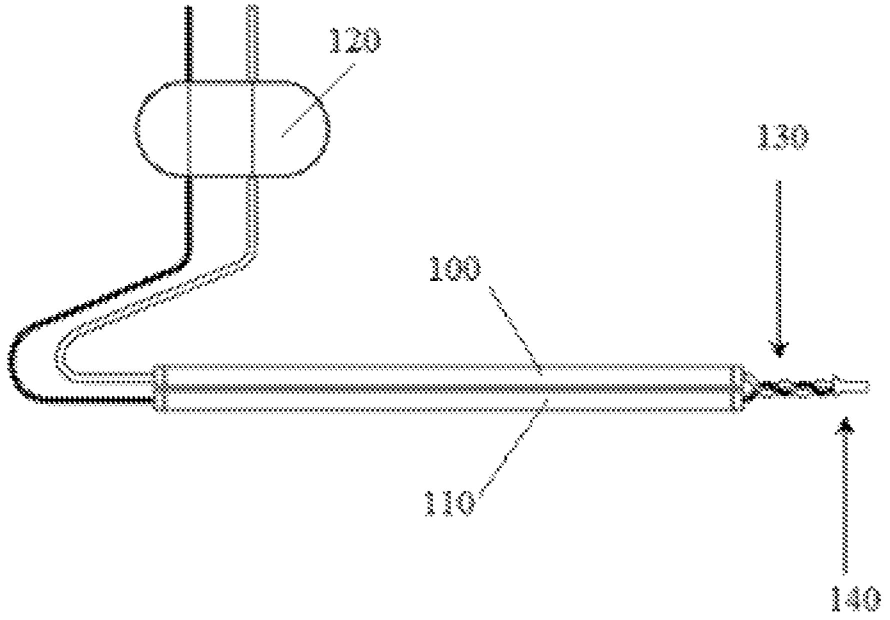
FIG. 1 shows an embodiment of the present invention.

FIG. 1 shows an embodiment of the present invention. Halogen tubes 100 and 110 are wired up to current source 120 as shown in the Figure, connected in series. The ends of the halogen tubes are wired together as shown in the Figure; in the embodiment shown in the Figure, the two wires are twisted together 130 and a wire cap 140 is placed on the twisted ends to insulate the connection. Thus, the current going through the first halogen tube 100 is opposite in phase from the current going through the second halogen tube 110, and the EMF emitted by the first halogen tube 100 is also opposite in phase from the EMF emitted by the second halogen tube 110. If the halogen tubes are identical and placed very close together, that means that the EMF emitted by the two tubes will be cancelled out, resulting in minimal EMF emissions for the whole assembly.

Figure 2:
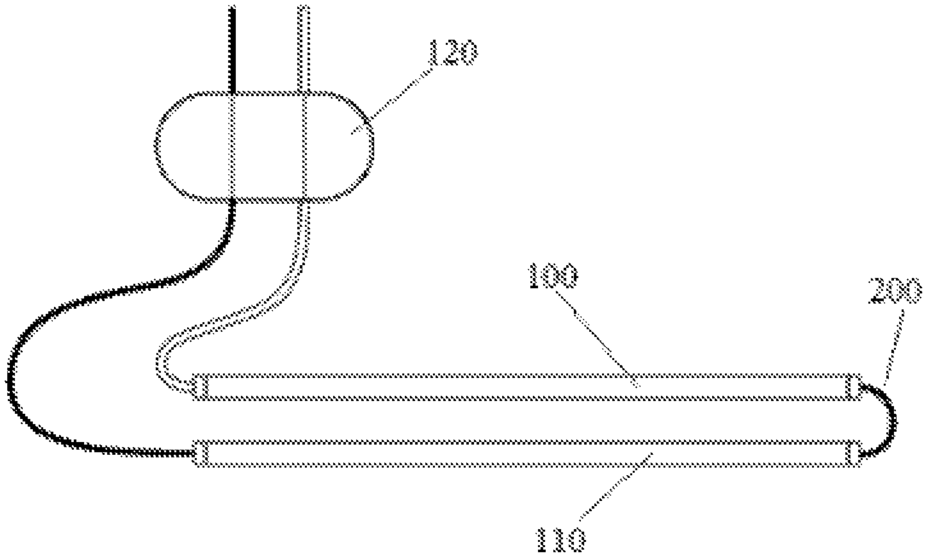
FIG. 2 shows an alternate embodiment of the present invention.

FIG. 2 shows an alternate embodiment of the connection between the two halogen tubes. Rather than a twist connection like the one shown in FIG. 1, a single wire 200 could be used to wire the two ends together.

Figure 3:
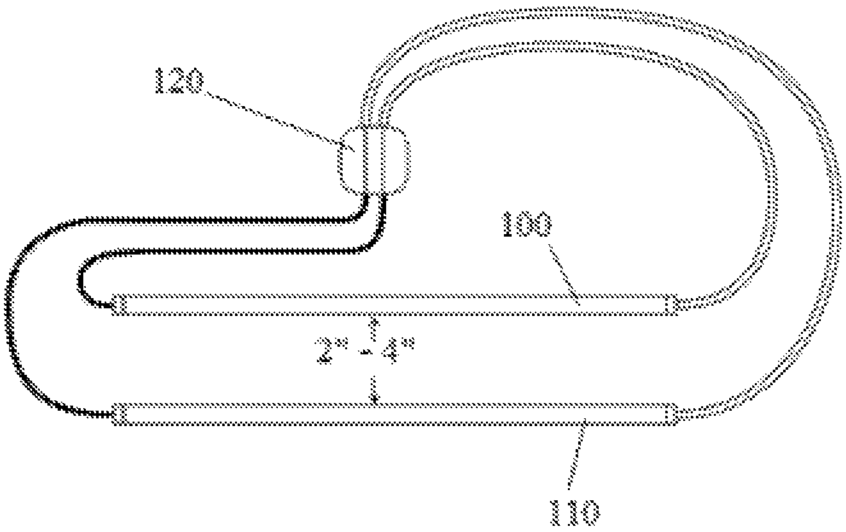
FIG. 3 shows an alternate embodiment of the present invention.

FIG. 3 shows an alternate embodiment of the present invention. In that embodiment, both halogen tubes are connected in parallel to the source of alternating current 120. However, tube 100 is connected to the source of alternating current in one direction and tube 110 is connected in the other direction. This way, the current is still in opposite phases in the two tubes.

Figure 4:
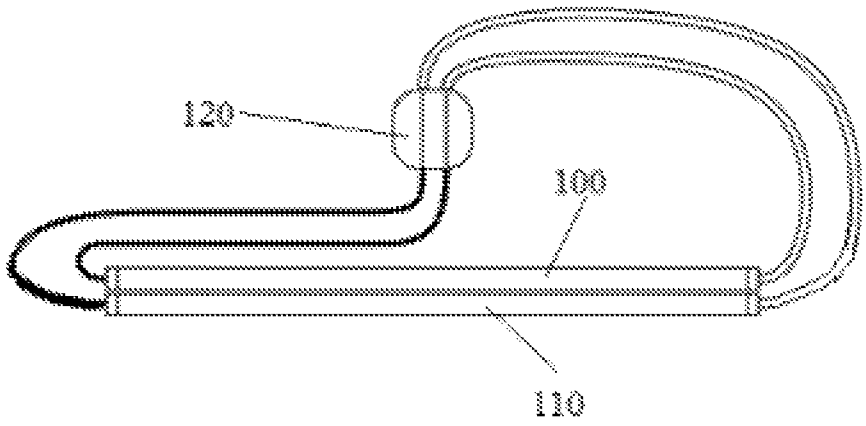
FIG. 4 shows an alternate embodiment of the present invention.

The distance between the tubes in this embodiment, as shown in the figure, is 2"-4". At that distance, the total EMF emitted by the assembly is 20-30 mG. In the preferred embodiment, however, the tubes are touching or nearly touching. When the tubes are touching, the total EMF emitted by the assembly is around 1-5 mG, as shown in FIG. 4.

The tubes are preferably attached to a mounting fixture in such a way as to keep them at the proper distance and the proper relative position to each other. The attachment may be permanent or temporary. In an embodiment, the distance between the halogen tubes may be adjustable to "tune" the amount of EMF emitted by the tubes.

The heater assembly preferably also comprises a reflector to reflect all the heat in the desired direction. The reflector may be a parabolic reflector or any other shape of reflector typically used in a sauna for halogen heaters.

The heater assembly may also comprise electrical shielding to block any remaining EMF from reaching the user. The shielding is preferably metal mesh that does not unduly block heat.

Exemplary embodiments are described above. It will be understood that the present invention comprises other embodiments, and that the invention is only limited by the appended claims.

The invention claimed is:

1. A heater for a sauna, said heater comprising:

a first heating mechanism including in the sauna;

a second heating mechanism configured to generate heat, wherein the first heating mechanism is implemented an adjustable distance from the second heating mechanism, and wherein the adjustable distance between the first heating mechanism and the second heating mechanism is configured to reduce an amount of electromagnetic field (EMF) emitted by the heater to be lower than a designated amount of EMF; and a source of alternating current electrically coupled to the first heating mechanism and the second heating mechanism such that the source of alternating current is configured to provide the first heating mechanism and the second heating mechanism with a current, wherein the current powering the first heating mechanism is out of phase with the current powering the second heating mechanism.

2. The heater of claim 1, wherein EMF emitted by the second heating mechanism cancels at least some of EMF emitted by the first heating mechanism.

3. The heater of claim 1, wherein the current powering the first heating mechanism is opposite in phase from the current powering the second heating mechanism.

4. The heater of claim 1, wherein the source of alternating current comprises a first pole and a second pole.

5. The heater of claim 1, wherein the first heating mechanism is the same length as the second heating mechanism and the same power as the second heating mechanism.

6. The heater of claim 1 further comprising:

an electrical connection from a first end of the first heating mechanism to the source of alternating current;

an electrical connection from a second end of the first heating mechanism to a third end of the second heating mechanism;

an electrical connection from a fourth end of the second heating mechanism to the source of alternating current.

7. The heater of claim 6, wherein the electrical connection from the second end of the first heating mechanism to the third end of the second heating mechanism comprises two twisted wires and an electrical cap.

8. A sauna, said sauna comprising:

a seating area;

a control panel comprising temperature and timing controls;

a first heating mechanism configured to generate heat towards the seating area;

a second heating mechanism configured to generate heat towards the seating area, wherein the first heating mechanism is implemented an adjustable distance from the second heating mechanism, and wherein the adjustable distance between the first heating mechanism and the second heating mechanism is configured to reduce an amount of electromagnetic field (EMF) emitted by the heater; and a source of alternating current electrically coupled to the first heating mechanism and the second heating mechanism such that the source of alternating current is configured to provide the first heating mechanism and the second heating mechanism with a current, wherein the current powering the first heating mechanism is out of phase with the current powering the second heating mechanism.

9. The sauna of claim 8, wherein EMF emitted by the second heating mechanism cancels at least some of EMF emitted by the first heating mechanism.

10. The sauna of claim 8, wherein the current powering the first heating mechanism is opposite in phase from the current powering the second heating mechanism.

11. The sauna of claim 8, wherein the source of alternating current comprises a first pole and a second pole.

12. The sauna of claim 8, wherein the first heating mechanism is the same length as the second heating mechanism and the same power as the second heating mechanism.

13. The sauna of claim 8 further comprising:

an electrical connection from a first end of the first heating mechanism to the source of alternating current;

an electrical connection from a second end of the first heating mechanism to a third end of the second heating mechanism;

an electrical connection from a fourth end of the second heating mechanism to the source of alternating current.

14. The sauna of claim 13, wherein the electrical connection from the second end of the first heating mechanism to the third end of the second heating mechanism comprises two twisted wires and an electrical cap.

15. A sauna heater, said sauna heater comprising:

a first heating mechanism configured to generate heat;

a second heating mechanism configured to generate heat, wherein the first heating mechanism is implemented an adjustable distance from the second heating mechanism, and wherein the adjustable distance between the first heating mechanism and the second heating mechanism is configurable to adjust an amount of electromagnetic field (EMF) emitted by the heater to be lower than a designated amount of EMF; and a source of alternating current electrically coupled to the first heating mechanism and the second heating mechanism such that the source of alternating current is configured to provide the first heating mechanism and the second heating mechanism with a current, wherein the current powering the first heating mechanism is out of phase with the current powering the second heating mechanism.

16. The sauna heater of claim 15, wherein EMF emitted by the second heating mechanism cancels at least some of EMF emitted by the first heating mechanism.

17. The sauna heater of claim 15, wherein the current powering the first heating mechanism is opposite in phase from the current powering the second heating mechanism.

18. The sauna heater of claim 15, wherein the source of alternating current comprises a first pole and a second pole.

19. The sauna heater of claim 15, wherein the first heating mechanism is the same length as the second heating mechanism and the same power as the second heating mechanism.

20. The sauna heater of claim 15 further comprising:

an electrical connection from a first end of the first heating mechanism to the source of alternating current;

an electrical connection from a second end of the first heating mechanism to a third end of the second heating mechanism;

an electrical connection from a fourth end of the second heating mechanism to the source of alternating current.

* * * * *